Figure 1:
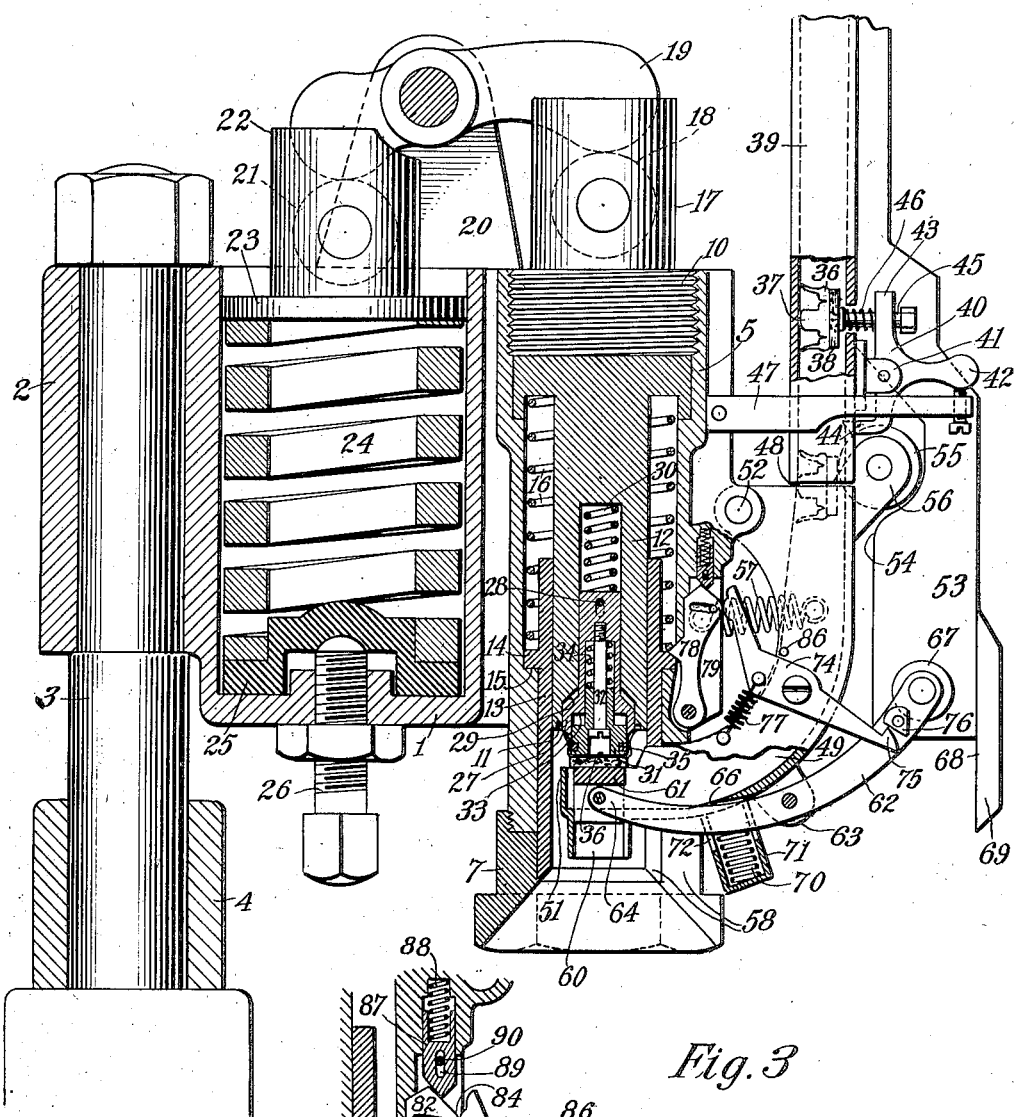

W. F. STONE.
BOTTLE SEALING MACHINE.
APPLICATION FILED APR. 14, 1911.

1,083,768.

Patented Jan. 6, 1914.
2 SHEETS—SHEET 1.

Witnesses:
S. C. Yeaton
E. B. Yeaton

William F. Stone
Inventor
By his Attorney
Hillary C. Messimer

W. F. STONE.
BOTTLE SEALING MACHINE.
APPLICATION FILED APR. 14, 1911.

1,083,768.

Patented Jan. 6, 1914.
2 SHEETS—SHEET 2.

Witnesses:
S. C. Yeaton
E. B. Yeaton

William F. Stone. Inventor
By his Attorney
Hillary C. Messimer

UNITED STATES PATENT OFFICE.

WILLIAM F. STONE, OF WOODBURY, NEW JERSEY, ASSIGNOR TO STAR SEAL COMPANY, A CORPORATION OF NEW YORK.

BOTTLE-SEALING MACHINE.

1,083,768.  Specification of Letters Patent.  Patented Jan. 6, 1914.

Application filed April 14, 1911. Serial No. 620,991.

*To all whom it may concern:*

Be it known that I, WILLIAM F. STONE, a citizen of the United States, and a resident of Woodbury, county of Gloucester, and State of New Jersey, have invented certain new and useful Improvements in Bottle-Sealing Machines, of which the following is a specification.

My invention applies solely to the seal feeding mechanism of bottle sealing machines and has for one of its objects the providing of means whereby the seals on leaving the source of supply enter a seal conveyer at one end thereof and are moved therethrough by their own gravity until they reach the opposite end in proper position to be fed to the sealing mechanism.

Another object of my invention is to devise means for facilitating relative movements of the feeding end of the conveyer and the sealing mechanism, to bring them from a sidewise relative position to a vertical relative position, to then bring them together by a vertical movement to transfer the seal from the feeding end of the conveyer to the sealing mechanism and finally to return the parts by reverse movements to their original relative positions.

A third object of my invention is to devise means whereby the transferring of the seal to the sealing mechanism is dependent upon the previously transferred seal having been first removed from the sealing mechanism, that is to say, is dependent upon the success of the previous sealing operation. This is preferably accomplished by making the relative vertical movement of the conveyer and sealing mechanism toward each other dependent upon a bottle having been inserted during the previous sealing operation in order to remove the seal previously conveyed to clear the way for another seal. For obtaining these results I have provided a preferably curved conveyer of suitable length and curvature to extend in its raised position from the source of seal supply to the sealing mechanism to enable a seal to be dropped into it at its supply end while another is being transferred to the sealing mechanism from its feed end. The conveyer is pivotally connected to the sealing mechanism to reciprocate therewith and to be swung to and fro during its reciprocating up and down. Its swinging movement outward is derived during its downward movement through a roller and engaging cam surface secured, one to the conveyer and the other to the framework. Its swinging movement inwardly is accomplished during its upward movement through the office of a recoiling tension spring. This brings the feeding end below the sealing mechanism in position to transfer its seal thereto.

To give the seal at the end of the conveyer the required vertical movement to the sealing mechanism a seal supporting plunger is provided. This plunger is moved to bring its upper face flush with the base of the conveyer in its outwardly swung position to permit a seal in its downward travel to slide thereon. When the conveyer is swung back to the sealing mechanism the seal supporting plunger then moves upward within the conveyer and transfers its seal to the sealing mechanism. The supporting plunger is first lowered by means of a lever fulcrumed to the conveyer, the free end of which encounters a stop when the conveyer is being swung outward to give the plunger the required downward movement. The upward movement of the supporting plunger is effected by means of the recoil of a tension spring which is timed to act when the conveyer has been swung to its inward position. Other mechanism is provided to prevent this spring from acting to raise the seal supporting plunger when the seal previously transferred to the sealing mechanism has for any reason escaped being removed during the previous sealing operation. This mechanism comprises a latch lever fulcrumed on the conveyer and having a spring actuated latch end for engagement with a catch on the seal supporting plunger lever to lock it with the conveyer in its outwardly swung position, that is to say, when the seal supporting plunger is lowered flush with the conveyer. In this locked position the seal supporting plunger will have no movement relative the conveyer and therefore will not transfer its seal to the sealing mechanism, but must wait until the latch has been released. This is effected by a trip arm pivoted to the sealing mechanism swung out in position to be struck by the latch lever. This releases the seal supporting plunger lever and permits its operating spring to then raise the seal supporting plunger to transfer its seal to the sealing mechanism. The latch releasing arm is, however, set outwardly in operable releasing position by means of a lug formed thereon contacting with a plunger forming part of the sealing mechanism when the two are permitted to have relative motion.

The plunger of the sealing mechanism preferably used for this purpose is the bottle centering and holding plunger. It can thus be seen that the releasing lever will not be thrown out in operable releasing position unless a bottle is in position to coact with the centering plunger. This stops the plunger while the releasing arm continues to move downwardly to give them the desired relative movement. It is therefore obvious that no seal will be transferred unless a bottle has been previously inserted to remove the seal. The releasing arm is held in its outer position by a spring-pressed pin acting on its upper end. This offers sufficient resistance to the arm being pushed in when it is struck by the latch lever to enable the latch to become unlocked, but at the same time to enable the latch lever to move the releasing arm back to its original position.

Figure 2:
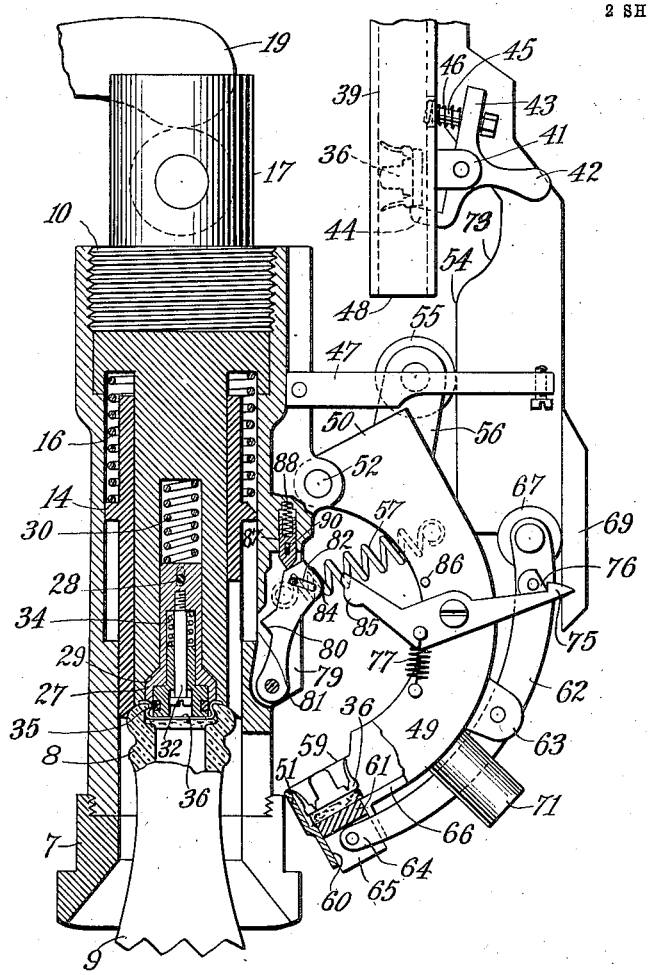
Figure 4:
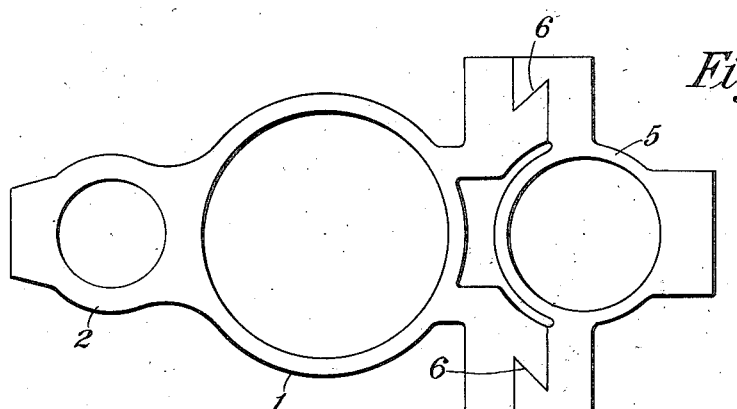

Referring to the drawings forming part of this specification—Figure 1 is a sectional elevational view of the bottle sealing head part of a bottle sealing machine, and my invention shown partly in sectional elevational view with the conveyer swung to its inward position and in the act of transferring a seal to the sealing mechanism from the feeding end thereof and receiving a seal at its opposite end. Fig. 2 is a similar view to Fig. 1 but showing only a part thereof, wherein a bottle and the sealing head are in sealing positions and the seal conveyer is in outward position in the act of receiving a seal at its feeding end. Fig. 3 is a fragmental detail of Fig. 1 showing the latch and releasing mechanism, and Fig. 4 is a plan view of the sealing head casements showing the manner of securing the parts in sliding engagement.

My invention is not confined to any one type of sealing head nor to any special seal but is applicable to many styles of sealing heads and seals. I have however shown my invention in conjunction with a seal and sealing head similar in the main to that contained in my copending application filed March 4, 1911, and bearing Serial Number 612,363. A brief description therefore of the sealing head is deemed all that is necessary in this application.

The sealing head comprises a spring supporting cup 1 having a side extension 2 bored to form a sleeve for mounting it in fixed position upon the vertical rod 3 slidably engaged in bearing 4 of the framework to receive the usual reciprocating motion from the mechanisms (not shown) to effect the sealing operation. The sealing mechanism casement 5 is slidably secured to the spring cup by means of the dove-tailed joint 6 (Fig. 4). This permits of the slight relative movement that is necessary in the sealing operation, as will later be described.

The casement 5 has a mouth-piece 7 preferably made separate and screwed on the casement for centering and guiding the bottle neck 8 of bottle 9 to its proper position beneath the sealing mechanism. Within the casement and rigidly secured thereto is the sealing member 10 having a forming end 11. This is also preferably formed separately from the casement and screwed in the top thereof. The sealing end 11 is formed on the lower end of a plug 12 depending from the member 10 and of less diameter than the bore of the casement to afford a space in which is slidably secured a plunger 13 having an upwardly converging lower end for centralizing the bottle and holding it secure upon its seat (not shown). This plunger is provided with a flange 14 engaging a shoulder 15 formed in the casement to arrest the downward movement of the plunger and a spring 16 is seated upon the flange to resist the upward movement of the plunger and to retain it in spring-pressed engagement with the neck of the bottle.

On the top of member 10 is a slotted post 17 in which is journaled the roller 18. This roller supports one end of a lever 19 fulcrumed to a lug 20 extending from the spring cup casement 1. The other end of the lever is similarly supported by a roller 21 journaled in a slotted post 22 projecting from a plunger 23 set in cup 1 to rest upon a spring 24. Below the spring is an adjustment plate 25 raised and lowered by adjustment screw 26 to vary the tension of the spring when desired. As the sealing head moves downward with its rod 3 the forming end 11 coacts with the edge of the seal which is then seated in the neck of the bottle and forms the seal joint. The further downward movement of the seal forming plunger is then arrested and the excess motion of the casement 5 is taken up by spring 24, the spring being made strong enough to first properly form the seal on the bottle. An auxiliary seal forming plunger 27 is engaged in a socket of the plug 12 having a slight relative motion therewith. It is restricted in its downward and upward movements by a pin 28 and seat 29 respectively and is backed by spring 30 to afford the required resistance to its upward movement to enable it to perform its office of spreading the flange on the seal preparatory to the sealing end 11 forming the seal within the bottle. A seal holding and seating plunger 31 is engaged in a socket formed in auxiliary seal forming plunger 27 to have suitable relative movement therewith. Its downward and upward relative movements are restricted by the screw 32 and seat 33 respectively and it is backed by a spring 34 to afford the required resistance to upward movement to enable it to receive a seal and to seat it within the bottle before the sealing operation begins. This plunger has an annular groove formed therein to receive a split ring 35. This ring retains the seal 36 when fed thereto in spring-pressed engagement upon the seating plunger.

The seals 36 are shown on account of their adaptability to the particular sealing device described, as composed of a disk of metal having upwardly turned lugs 37 and faced with a yielding sealing washer 38. The seals are fed by any suitable means in uniform position to a chute 39. They drop down this chute until arrested by suitable feeding mechanism. This mechanism comprises a rock lever 40 fulcrumed to lugs 41 projecting from the seal chute. The lever has a horizontal operating arm 42 and two vertical arms 43 and 44. The lower arm 44 has a hooked end which enters the chute through a slot, and is normally in supporting position below the lowermost seal to check it and the seals above in their travel down the chute. The lever arm 43 has a slidably mounted pin 45 passing through it which likewise projects into the chute through a slot formed in its wall but which is normally free from contact with the seals. When however its arm 43 is swung toward the chute it will then contact with the washer side of the seal which is purposely passed through the chute in position to be adjacent this pin. A spring 46 mounted on the pin is applied between a head formed thereon and the lever arm 43 to retain the head in spring-pressed engagement with the seal when its lever arm is swung in. The lever as thus swung engages the pins with its adjacent seal and holds it and the seals above temporarily in check. At the same time that the upper arm engages its adjacent seal, the lower arm 44 is freed from engagement with its seal which thereupon drops from the chute. The upper and lower arms are suitably spaced to operate on adjacent seals so that only one seal can escape at each rocking of the lever. After the seal has escaped the lever rocks to its normal position. This carries the hooked arm into the chute again in its former position and releases the spring-pressed pin from engagement with its seal to permit the seal to drop against the hooked end which also permits the seals above to drop a corresponding distance.

The lever is rocked to release a seal by means of an arm 47 secured to the sealing head to move up and down with it. This arm strikes the horizontal arm 42 to swing it upwardly to permit the seal to escape when the sealing head has moved to its upward position. The arm 47 is provided at its operating end with an adjustment screw which contacts directly with the horizontal arm 42 as the sealing head is raised and which may be adjusted to correctly time the escapement of the seal.

Those parts of the sealing machine comprising my invention will now be considered in detail. It being understood, however, that many minor changes may be made in the preferred construction here shown without departing from the spirit of my invention, as for instance, when my invention is applied to other types of sealing heads and seal supplying sources.

The chute proper 39 for the seals is preferably terminated at a convenient point in its vertical descent below the escapement lever as at the point 48. My conveyer comprises a conduit 49 movable upwardly to bring its receiving end 50 adjacent the end 48, which movement is timed to permit the then escaped and dropping seal to fall into the conveyer conduit. The conduit is suitably curved to bring its lower or seal feeding end 51 in this upwardly moved position directly below the seal holding and seating plunger 31. The conveyer is hinged to the sealing head casement 5 by suitable pivotal connections 52 to permit it to reciprocate up and down therewith. The conveyer receives its swinging motion outwardly by means of a cam plate 53 rigidly secured to the framework, or as shown, to the chute 39 and provided with a cam face 54 which engages an antifriction roller 55 pivotally connected to lug 56 projecting from the conveyer to swing the conveyer outwardly as the sealing head descends. A tension spring 57 secured to the conveyer and sealing head returns the conveyer to its inwardly swung position when the sealing head is moving upward. The sealing head casement and plunger 13 are provided with slots or openings 58 to admit the feeding end 51 of the conveyer.

The conveyer conduit 49 is preferably closed except at the receiving end 50 and at its feeding end 51, at which last end an outlet 59 is provided in the top wall to permit the seals to be ejected in transferring them upon the seal holding and seating plunger 31. In the bottom wall of the conveyer conduit opposite the outlet is a bossed orifice 60 having a plunger 61 engaged therein to be moved up and down. This motion is accomplished by means of a preferably curved lever 62 fulcrumed to lugs 63 projecting from the back of conveyer conduit and having its lower end 64 pivotally secured in slot 65 formed in the bottom of plunger 61. The conveyer conduit is suitably formed with a slot 66 to permit the lever to enter in moving the plunger to its upward position. The opposite end of the lever is preferably provided with an antifriction roller 67. This engages with a suitably formed cam face 68 formed on plate 69 rigidly secured to or made integral with the plate 53.

The roller and its coacting surface are brought into contact by the outward swing of the conveyer. This stops that end of the lever and during further outward swing of the conveyer the lever is compelled to rock on its fulcrum to lower the plunger. This brings its upper face flush with the base of the conduit.

A recess 73 is formed in the cam face 54 at a suitable position to induce the outward swing of the conveyer to take place at or near the beginning of its downward movement, and the inward swing at or near the end of the upward movement. Below the recess the cam face is formed vertical. This permits the conveyer during the remainder of its reciprocating movement to stand in its outwardly swung position to prevent its feeding end from interfering with the inserted bottle. The lever 62 is likewise rocked at or near the beginning of the downward movement of the conveyer to move the plunger 61 downwardly. The plunger is locked in this position, as will soon be described, and is not released until it arrives at a suitable point in the upward movement of the conveyer. During the outwardly swung position the lower or feed end of the conveyer is sufficiently inclined to permit the seal which has previously dropped into the conveyer at the top to slide by its own gravity to the feeding end and to rest on the supporting plunger 61, as seen in Fig. 2. A spring 70 is secured in a cup 71 projecting from the rear of the conveyer. The cup is provided with the slot 72 to permit the lever to pass therethrough to be engaged by the spring below it which acts to rock the lever to its normal position when released, as will soon be described.

The mechanism thus far considered would suffice to feed the seals to the holding plunger 31 without any locking mechanism for the lever 62, providing the upward movement of the plunger 61 were timed to occur when the feeding end of the conveyer was swung inwardly for then the seal supported on the plunger 61 would be properly transferred to the holding plunger 31. This mechanism is all that is necessary then unless from any reason the seal previously deposited upon the holding plunger 31 has not been removed by the bottle in the sealing operation. At such a time, the seal supporting plunger 61 should not be given its usual movement upward in order to prevent the disastrous results of attempting to feed a second seal to the plunger 31 when the previous seal had not been removed. The following mechanism is therefore provided to hold the plunger 61 in check at such times: A lever 74 is pivotally connected to the side of the conveyer. Its outer end is formed into a hook or latch 75 for engaging a lug 76 projecting from the free end of the lever 62 as the conveyer is swung outward, as above described. This locks the plunger 61 in its downward position at each outward swing of the conveyer and a spring 77 is secured to the lever 62 and conveyer wall to hold the latch in its locked position as shown in Fig. 2. As thus locked there would be no feeding of seals for the conveyer would simply swing to and fro without any upward movement of the plunger 61. A releasing arm 78 is therefore provided for releasing the latch. This arm is pivoted at its lower end in a slot 79 formed in the sealing head casement. It is, however, operably set only when a bottle is being sealed. This is accomplished by a tapering lug 80 formed on the arm which projects in normal position through an orifice 81 formed in the wall of the sealing head casement to be in the path of the flange 14, which at this part is given a tapering face to engage the tapering face of the lug. The arm is formed with a slot 82 which engages the stop pin 83 secured in the sealing head casement to limit the swing of the arm. A nose 84 is also formed on the arm for coacting with a corresponding nose 85 formed on the latch lever 74 when the arm is forced outwardly in order to effect a releasing of the latch and a corresponding forcing of the arm inwardly to its original position. A stop pin 86 is provided on the conveyer wall for arresting the swing of the latch lever when released and to enable the nose thereon to positively force the arm 78 inwardly. A friction pin 87 backed by a spring 88 is set in a socket formed in the sealing head casement to be forced normally outwardly by the tension of the spring. The pin is further provided with a slot 89 which engages a stop pin 90 secured in the casement to retain the friction pin in position. The friction pin 87 bears against the arm 78 and their coacting faces are preferably wedge-shaped to permit the arm to be yieldingly retained in either of its extreme positions but to permit it to be swung from one extreme position to the other by forcing it past the pin.

The operation of the device is as follows: Supposing the sealing head to be descending in the act of sealing a bottle and a seal to have been previously dropped into the conveyer conduit from the source of supply; the roller 55 in leaving the recess 73 to enter upon its descent down the vertical part of the cam face swings the conveyer outwardly. This brings the roller 67 in contact with the vertical cam face 68 which contact swings the lever 62 to move the plunger 61 downwardly flush with the base of the conveyer conduit. At the same time the latch snaps into locked engagement with its lug. The outward swing of the conveyer gives its feeding end a sufficient incline to permit the seal contained therein to slide down and set upon the supporting plunger 61. The conveyer is now ready to be swung inwardly. During the outward swing and downward movement of the conveyer, the sealing operation takes place. The bottle comes in contact with its centering and holding plunger to arrest its movement downward while the sealing head casement continues to move downwardly. This relative motion of the sealing head casement and centering plunger forces the releasing arm 78 outwardly past its friction pin from the position shown in Fig. 1 to that shown in Fig. 2. The inward swing of the conveyer is accomplished when the sealing head moves upward and the roller 53 enters the recess 73. The latch remains locked however until the nose on the latch lever 74 strikes the nose on the releasing arm 78 which is timed to occur when the feed end of the conveyer has been swung inwardly beneath the seal holding plunger 31. This releases the latch and the lever is then free to be swung by the spring 70 to raise the seal supporting plunger 61 to enable it to deposit the seal resting on it upon the holding and seating plunger where it is held by the split ring 35 ready for another bottle. The arm 78 at the same time is swung in by its contact with the lever 74. This swings it past its friction pin to its normal position with its lug in the path of the flange 14 as shown in Figs. 1 and 3, the sealing head having first been raised to bring the arm above the flange as there shown. In the raised position of the sealing head the arm 47 (or its adjustment screw) strikes the arm 42 and rocks its lever to permit another seal to drop into the conveyer.

It is obvious that as the outward swing of the releasing arm 78 is dependent upon the relative movement of the sealing head casement and the bottle centering plunger, it will not be moved when there is no bottle inserted to produce such a motion. The latch will therefore not be released and a second seal will not be fed to the seating plunger.

Having thus described my invention I claim—

1. The combination in a bottle sealing machine, of a sealing head; a seal supplying source; and a seal conveyer comprising a conduit having a seal receiving end communicating with the said supply source and a seal delivering end communicating with the said sealing head, means for moving the said delivering end away from said sealing head and below said receiving end to facilitate the moving of the seals from said receiving end to said delivering end, means at the said delivering end movable to the said sealing head to deliver its seal thereto intermittently between the sealing operations and operating means for said last means dependently operable upon the insertion of a bottle during the previous sealing operation.

2. The combination in a bottle sealing machine, of a sealing head; a seal supplying source; and a seal conveyer comprising a conduit having a seal receiving end communicating with the said supply source and a seal delivering end communicating with the said sealing head, means for moving the said delivering end away from said sealing head and below said receiving end to facilitate the moving of the seals from said receiving end to said delivering end, seal supporting means at the said delivery end movable to the said sealing head intermittently between the sealing operations for transferring the seal to the sealing head when moved thereto, said last means being dependently operable upon the insertion of a bottle during the previous sealing operation.

3. The combination in a bottle sealing machine, of a sealing head; a seal supplying source; and a seal conveyer, comprising a conduit having a seal receiving end communicating with the said supply source and a seal delivery end communicating with the said sealing head, means for moving the said delivering end away from said sealing head and below said receiving end to facilitate the moving of the seals from said receiving end to said delivering end, seal supporting means at the said delivery end movable to the said sealing head intermittently between the sealing operations, and other means dependently operable upon the insertion of a bottle during the previous sealing operation for moving the seal supporting means to the sealing head for transferring the seal.

4. The combination in a bottle sealing machine, of a sealing head; a seal supplying source; and a seal conveyer comprising a conduit having a seal receiving end communicating with the said supply source and a seal delivery end communicating with the said sealing head, means for moving the said delivering end away from said sealing head and below said receiving end to facilitate the moving of the seals from said receiving end to said delivering end, means at the said delivery end movable to the said sealing head for delivering the seal thereto and other means dependently operable upon the insertion of a bottle during the previous sealing operation for moving said last means when moved to the sealing head.

5. The combination in a bottle sealing machine of a reciprocating sealing head; a seal supply source; and a seal conveyer reciprocating with said head comprising a conduit having a seal receiving end communicating with the said supply source and a seal delivery end communicating with the said sealing head, and means for moving the said delivery end away from said sealing head and below the said receiving end on the downward movement of the sealing head to facilitate a moving of the seals from said receiving end to said delivery end.

6. The combination in a bottle sealing machine of a sealing head; a seal supply source; and a seal conveyer comprising a conduit hinged to the said sealing head, means for swinging said conduit to and fro to bring its lower end to and from the said sealing head, a seal supporting member at said lower end, and means for reciprocating said member up and down when said lower end is swung to said sealing head to transfer the said seal to the said sealing head.

7. The combination in a bottle sealing machine of a reciprocating sealing head; a seal supply source; and a seal conveyer hinged at its upper end to said sealing head to reciprocate therewith, and means for swinging it outwardly during the downward movement of the sealing head and inwardly during the upward movement of the sealing head to bring its lower end into communication with the sealing head to deliver its seal thereto.

8. The combination in a bottle sealing machine of a reciprocating sealing head; a seal supply source; a seal conveyer hinged at its upper end to said sealing head to reciprocate therewith; means for swinging said conveyer outwardly during the downward movement of the sealing head and inwardly during the upward movement of the sealing head to bring its lower end into communication with the sealing head; a seal supporting member at the lower end of said conveyer, and means for reciprocating the said member up and down relative the sealing head at the inwardly swung position of the conveyer to deposit the seal upon the sealing head.

9. The combination in a bottle sealing machine of a reciprocating sealing head; a seal supply source; and a seal conveyer comprising a conduit hinged to said sealing head having an opening at the top for receiving the seals and an opening at the bottom for emitting them, a seal supporting plunger mounted to reciprocate below said seal emitting opening, means for moving the lower end of the said conduit to and from the sealing head, means for lowering the said supporting plunger during its movement away from the said sealing head, and other means for holding said supporting plunger in said lowered position automatically releasable to raise said supporting plunger when moved to said sealing head to deposit its seal thereto said releasing being dependent upon the insertion of a bottle during the previous sealing operation.

10. The combination in a bottle sealing machine of a sealing head, and a seal feed comprising a seal support at its feeding end, means for moving said support downwardly from said sealing head, means for locking said support in said downwardly moved position, and other means for automatically releasing said locking means to permit the support to move upwardly and deposit its seal upon the sealing head said releasing means being operatively dependent upon the insertion of a bottle.

11. In a bottle sealing machine the combination of a reciprocating sealing head comprising a casement, a bottle holding plunger and a seal holding plunger; a seal supply source comprising a seal escapement mechanism operated by the said casement; and a seal conveyer comprising a conduit hinged to the said casement, cam mechanism to swing the said conduit outwardly in its descending movement to induce a seal to drop to its lower end, a tension spring to bring said conduit inwardly in its ascending movement to deposit the said seal upon the said seal holding plunger and to receive another seal at its upper end, a seal supporting plunger in the lower end of said conduit for transferring the said seal to the said seal holding plunger, a lever for reciprocating said seal supporting plunger to effect a receiving and transferring of said seal, cam mechanism for swinging said lever to lower the said supporting plunger, a spring for oppositely swinging the said lever to raise the said supporting plunger, a locking lever for holding the said plunger operating lever in its cam propelled position, a releasing arm to release said locking lever when said seal supporting plunger is swung beneath said seal holding plunger operably responsive to the said bottle holding plunger when stopped by a bottle, and a spring-pressed friction pin contacting with said arm to offer a resistance to its movement.

12. A closure-feeding and closure-applying mechanism including a closure-feeding chute member and a sealing-head-including member movable to and from closure transferring proximity to each other, said mechanism also including means, operatively connecting said members, for causing them to move in unison, substantially as described.

13. A closure-feeding and closure-applying mechanism including a pivoted closure-feeding chute member and a sealing-head-including member movable to and from closure-transferring proximity to each other, said mechanism also including means, operatively connecting said members, for causing them to move in unison, substantially as described.

14. A closure-feeding and closure-applying mechanism including a closure-feeding chute member and a thrustwise movable sealing-head-including member movable to and from closure-transferring proximity to each other, said mechanism also including means, operatively connecting said members, for causing them to move in unison, substantially as described.

15. A closure-feeding and closure-applying mechanism including a movable sealing-head-including member and a closure-feeding chute member having movement into and out of closure transferring proximity to the first member, said mechanism also including means, controlled from the first member, for effecting said movement of the second member, substantially as described.

16. A closure-feeding and closure-applying mechanism including a movable sealing-head-including member and a closure-feeding chute member having pivotal movement into and out of closure-transferring proximity to the first member, said mechanism also including means, controlled from the first member, for effecting said movement of the second member, substantially as described.

17. A closure-feeding and closure-applying mechanism including a sealing-head-including member having thrustwise movement and a closure-feeding chute member having movement into and out of closure-transferring proximity to the first member, said mechanism also including means, controlled from the first member, for effecting said movement of the second member, substantially as described.

18. In combination, with a sealing mechanism having a sealing-head, a closure chute movable into and out of closure-transferring relation to the sealing-head and means, carried by said chute, for normally restraining the feed of the closures, said means being movable with the chute against said mechanism and by the latter thereupon moved to release the closures, substantially as described.

WILLIAM F. STONE.

Witnesses:
HOWARD L. HUTCHINSON,
FRANCIS B. DAVIS.